(12) United States Patent
Van Der Meijs et al.

(10) Patent No.: US 11,377,030 B2
(45) Date of Patent: Jul. 5, 2022

(54) MIRROR ADJUSTMENT ASSISTANCE SYSTEM FOR TRUCKS

(71) Applicant: DAF Trucks N.V., Eindhoven (NL)

(72) Inventors: Floris Van Der Meijs, s-Hertogenbosch (NL); Huub Van Berlo, Sevenum (NL)

(73) Assignee: DAF Trucks N.V., Eindhoven (NL)

( * ) Notice: Subject to any disclaimer, the term of this patent is extended or adjusted under 35 U.S.C. 154(b) by 527 days.

(21) Appl. No.: 16/318,872

(22) PCT Filed: Jul. 19, 2017

(86) PCT No.: PCT/NL2017/050485
§ 371 (c)(1),
(2) Date: Jan. 18, 2019

(87) PCT Pub. No.: WO2018/016951
PCT Pub. Date: Jan. 25, 2018

(65) Prior Publication Data
US 2019/0241125 A1     Aug. 8, 2019

(30) Foreign Application Priority Data

Jul. 20, 2016 (NL) .................................... 2017200

(51) Int. Cl.
*B60R 1/00* (2022.01)
*B60R 1/06* (2006.01)
*B60R 1/10* (2006.01)

(52) U.S. Cl.
CPC .............. *B60R 1/002* (2013.01); *B60R 1/007* (2013.01); *B60R 1/06* (2013.01); *B60R 1/0605* (2013.01); *B60R 1/0607* (2013.01); *B60R 1/10* (2013.01)

(58) Field of Classification Search
CPC .. B60R 1/082; B60R 1/06; B60R 1/08; B60R 1/081; B60R 1/10; B60R 11/04;
(Continued)

(56) References Cited

U.S. PATENT DOCUMENTS

| 4,730,926 A | 3/1988 | Wedemeyer |
| 5,022,747 A | 6/1991 | Polanyi et al. |

(Continued)

FOREIGN PATENT DOCUMENTS

DE     4019234 A1     12/1991

OTHER PUBLICATIONS

Nov. 14, 2017—ISR & WO—App. PCT/NL2017/050485.

*Primary Examiner* — Collin X Beatty
*Assistant Examiner* — Grant A Gagnon
(74) *Attorney, Agent, or Firm* — Banner & Witcoff, Ltd.

(57) ABSTRACT

A mirror adjustment assistance system for trucks having as part of a vehicle body at least a cabin (3) having a front side with respect to an intended main direction of travel, a driver side, and a co-driver side. At least three adjustable mirrors (5, 7, 9, 11, 13, 19) are attached to an exterior of the vehicle body or cabin (3), each of the at least three adjustable mirrors (5, 7, 9, 11, 13, 19) has an aiming marker (43, 45, 59, 61, 65, 69) on or adjacent its reflective surface. At least two vehicle body target markers (41, 57, 63, 67) are positioned on an exterior surface of the vehicle body (3), and at least a single one (41; 57) of the at least two vehicle body target markers is associated with two of the at least three mirrors (5, 9; 7, 11). Any aiming marker (43, 45, 59, 61, 65, 69) of the at least three adjustable mirrors (5, 7, 9, 11, 13, 19) can only be aligned with a single one of the at least two vehicle body target markers (41, 57, 63, 67).

16 Claims, 10 Drawing Sheets

(58) Field of Classification Search
CPC ......... B60R 1/00; B60R 1/025; B60R 1/0602;
B60R 1/0605; B60R 1/0612; B60R 1/072;
B60R 1/088; B60R 1/12; B60R 1/1207;
B60R 2001/1253; B60R 2011/004; B60R
2300/105; B60R 2300/207; B60R
2300/8046
USPC ........................................................ 359/850
See application file for complete search history.

(56) References Cited

U.S. PATENT DOCUMENTS

| | | |
|---|---|---|
| 5,122,910 A | 6/1992 | Polanyi et al. |
| 2010/0017071 A1 | 1/2010 | Ryu et al. |
| 2011/0310503 A1* | 12/2011 | Lang ................. B60R 1/082 359/864 |
| 2015/0224931 A1 | 8/2015 | Sulc |

* cited by examiner

MIRROR ADJUSTMENT ASSISTANCE SYSTEM FOR TRUCKS

CROSS-REFERENCE TO RELATED APPLICATIONS

This application is a U.S. National Stage application under 35 U.S.C. § 371 of International Application PCT/NL2017/050485 (published as WO2018/016951 A1), filed Jul. 19, 2017, which claims the benefit of priority to Application NL 2017200, filed Jul. 20, 2016. Benefit of the filing date of each of these prior applications is hereby claimed. Each of these prior applications is hereby incorporated by reference in its entirety.

The invention relates to a mirror adjustment assistance system for trucks. The expression "trucks" is used in this specification as a generic nominator for power-driven vehicles having at least four wheels, and arranged for carrying goods or passengers, including towing vehicles such as tractors coupled to a trailer, and also includes those for military, off-road and agricultural use. By nature of this invention specifically also touring cars for the transport of relatively large groups of passengers are also included when reference is made to "truck". In particular the invention relates to such vehicles having more than one exterior mirror on the same side (driver side or co-driver/passenger side).

Devices for indirect vision, particularly including rear view mirrors and blind spot mirrors, and/or camera systems are important installations to the above defined category of trucks in particular to eliminate the effect of bodywork features that reduce the driver's field of vision. A large collection of different mirrors is now legally required equipment to this category of vehicles in the interest of road safety. By their very nature such mirrors must each be independently and individually adjustable.

Improper adjusted mirrors are nonetheless an important cause of accidents involving trucks. Particular serious accidents are those between trucks taking a right turn and cyclists. Although proper mirror adjustment is the responsibility of the driver, research has revealed that about 80% of professional truck drivers lack the necessary knowledge to properly adjust their mirrors.

The currently mandatory interior and exterior mirrors for road vehicles (e.g. Classes I to VII), and in particular their fields of vision are defined in ECE-R 46. In addition the International Standard ISO 16505 gives minimum safety, ergonomic and performance requirements for Camera-Monitor-Systems (CMS) as used in road vehicles to present the required outside information of a specific in-vehicle field of view. In particular ISO 16505 also defines a maximum distance from the driver eye reference point to the co-driver side class II, III and IV mirrors (as defined in ECE R46).

Proper mirror adjustment to meet present day complex legislation is quite a challenge and requires special knowledge and tools, such as knowledge about legislation (what the driver should see in each mirror), and a mirror adjustment area having the legally required fields of view mapped on its surface.

Governments, insurance companies and transport companies do recognize the importance of proper mirror adjustment and invest in solving this problem by creating mirror adjustment areas for example at truck parking lots, at petrol stations and at the premises of transport companies. In the Netherlands there are presently approximately 40 public mirror adjustment areas. Driver training is also offered to improve the driver's mirror adjustment skills in the interest of road safety. These measures do help in solving the problem to some extend, but are costly, time consuming and not always readily available.

A system of lining up a target marker on a fixed vehicle body part, which is reflected in the adjustable mirror surface, with an aiming marker on the mirror surface is already known for passenger cars. Examples are shown in US 2015/0224931 and U.S. Pat. No. 5,022,747. Document US 2015/0224931 uses an aiming marker on the movable mirror glass surface and a target marker located on the fixed outer mirror housing. If these are lined up the mirror is adjusted properly. This specific mirror housing design with integral marker can not be applied to vehicles where the mirror housing location is dependent on the configuration of the vehicle in respect of cab type, tire size, type of suspension, vehicle body and/or chassis type, such as is the case with trucks. Difference in height between lowest and highest truck cabs can amount to 600 mm, and height differences between off-road and low deck chassis of trucks can be as much as 500 mm. This would require dedicated mirror housing designs for each configuration to enable offering of the target marker on the outer mirror body, if possible at all. Moreover there are also differences in the cabin size in relation to vehicle bodies. Cabins of trucks often come in several sizes, depending on whether the chassis type is for a truck intended for light weight duties, such as making deliveries, or for heavy duty, such as long distance haulage. With the smaller version of cab type the vehicle body can often be wider than the cabin, and thereby interfere with the field of vision. Interference of vehicle body parts with the field of vision also requires reposition of the mirrors at a greater distance from the cabin.

In U.S. Pat. No. 5,022,747 an auxiliary mirror is located on the adjustable mirror surface for the specific purpose of lining up with a target marker on the exterior of the vehicle body. The auxiliary mirror is positioned at an angle relative to the reflective surface of the rear view mirror. The auxiliary mirror interferes with a portion of the surface area of side view mirror and as a result reduces and obstructs the functional field of vision. Also the small dimensions of the auxiliary mirror make it difficult to find the target marker. Truck mirrors are located further away from the driver, and the distance between driver and co-driver class II main rearview mirrors can be significantly more then 2 meters. This implies that such auxiliary mirrors as proposed by U.S. Pat. No. 5,022,747 need to be relatively large in order to be usable on a truck. Furthermore it is not allowed to have obstructions in the legal field of vision that exceed more than about 10% thereof, and to accommodate the auxiliary mirror outside of the required field of vision on the mirror surface would hence require larger mirrors. Enlarging the mirrors on trucks is generally objectionable, as it would increase the blind spots behind the mirror and also have a negative effect on aerodynamics, causing higher fuel costs. Also it would be undesirable to sacrifice the 10% legal margin for obstructions that do not have a continuous function. It is for instance already impossible on the co-drivers side of a truck to prevent that part of the field of vision of a class V kerb mirror is obstructed by the presence of the class II main rear view mirror, and the class IV wide-angle mirror in this close proximity field of kerb vision. It is clear that any unnecessary increase of mirror surface is to be avoided.

Therefore a need still exists for an easier, faster and more cost effective way to assist truck drivers in properly setting up their mirrors. In particular proper mirror adjustment should preferably be obtained without a need for special knowledge or availability of mirror adjustment areas.

Accordingly it is an object of the present invention to propose an improved mirror adjustment assistance system for trucks having more than one exterior mirror on the same side. In a more general sense it is thus an object of the invention to overcome or reduce at least one of the disadvantages of the prior art. It is also an object of the present invention to provide alternative solutions which are less cumbersome in construction and in operation and which moreover can be obtained relatively inexpensively. Alternatively it is an object of the invention to at least provide a useful alternative.

To achieve these objects the invention provides for a mirror adjustment assistance system as defined in one or more of the appended claims. The mirror adjustment assistance system according to the invention in particular includes as part of a vehicle body at least a cabin having a front side with respect to an intended main direction of travel, a driver side, and a co-driver side. At least three independently adjustable mirrors are attached to an exterior of the cabin, each of these at least three adjustable mirrors has an aiming marker on or adjacent to its reflective surface. At least one vehicle body target marker is positioned on an exterior surface of the vehicle body, and the at least one vehicle body target marker is associated with at least two of the at least three adjustable mirrors. Any of the aiming markers of at least two of the at least three adjustable mirrors can each only be aligned with the at least one vehicle target marker. The at least one vehicle body target marker in one embodiment can be one of at least two vehicle body target markers. At least a single one of those at least two vehicle body target markers can then be associated with two of the at least three mirrors, and any aiming marker of the at least three adjustable mirrors will each preferably be alignable with only a single one of the at least two vehicle body target markers. Position markers on the mirrors and position markers on the side of the truck can be provided as simple stickers, or alternatively as lamps, elements protruding from the cabin, three-dimensional shapes, local raised portions, fender cutouts etc. The position marker on the mirror is thereby then used as a reference to adjust the mirror to the correct angle. When the driver is in the driving position and looks at the mirror then the markers need only to be lined up by adjusting the mirrors. When both markers are lined up, with the position marker on the vehicle in the correct spot in the mirror surface, the mirrors are properly adjusted. This solution allows the driver to properly set up his mirrors in seconds without requiring any special knowledge, tools or the use of a mirror adjustment area.

Because the position marker on the vehicle has a fixed relation with respect to the legal fields of vision it can be used as a target for adjusting the mirrors, irrespective of driver size or sitting position. Because of the fixed relation between the marker on the vehicle and the legal fields of view the mirror is automatically at the proper position to meet legal requirements, when both the marker on the vehicle and the marker on the mirror are lined up as seen from the driving position. The driver's eye points in normal driving positon are depending on two degrees of freedom: (i) seat position: forward or backwards (horizontal), and (ii) height: driver size and seat height adjustment (vertical). Mirror adjustment is needed to compensated these different eye positions, by tilting up or down to adjust to eye point height, and by turning left or right to adjust to eye point distance. By adjusting the mirrors each driver can line up the markers from each personal driving position. The advantages of the present invention in relation to existing prior art are simplicity of design. The obtained mirror adjustment assistance system is easy to use, accurate, and cost effective. It also avoids any redesign of the mirror or mirror housing, which avoids negative effects such as larger mirror required in order to stay within legal requirement concerning indirect vision. Further advantages include no increased blind spot, larger mirrors takes away more direct vision; no increase of cost price, as larger mirrors would require more material; no negative effect on aerodynamics, which would lead to an increase in fuel consumption; no need for many different mirror variants due to large number of vehicle configurations; and no increasing of costs due to impact on manufacturing (such as increased tooling costs, handling at the factory etc.). The system can be easily applied to any existing mirror, and thus can also be offered as a stand alone (aftermarket) product that takes into account the relevant vehicle variant. The aiming marker on the reflective mirror surface is not obtrusive; it does not compromise the quality of the view in the mirror by adding auxiliary mirrors. Only small and subtle markers are required. The system also in particular is applicable to vehicles equipped with more then one mirror where it is important to prevent any confusion about which marker applies to which mirror. This is realized by locating the markers in such a way that only one marker will ever be visible in each single mirror. For example, by using the same marker for class II and class IV mirror.

In one embodiment of the system of the invention a first of the at least three adjustable mirrors is a main rear view mirror, and a second of the at least three independently adjustable mirrors is a wide-angle blind spot mirror, and a first of the at least two body target markers is the single one body target marker associated with the first and second of the at least three adjustable mirrors for alignment with the aiming markers of these first and second adjustable mirrors. In a further modification of this embodiment the first body target marker is located at a rear edge of the cabin with respect to the intended main direction of travel. This embodiment may optionally also be further modified in that the first and second adjustable mirrors are located on the co-driver side, wherein a third of the at least three adjustable mirrors is a close proximity kerb mirror on the co-driver side, and wherein a second of the at least two body target markers is positioned for being exclusively alignable with the third adjustable mirror.

Optionally in an embodiment of the present invention some or all of the at least three independently adjustable mirrors can advantageously be remotely adjustable by electric power.

At least one of the aiming markers, and at least one associated body marker can be readily recognizable indicia contrasting with their immediately surrounding surface area.

Alternatively or even additionally at least one of the aiming markers, and at least one associated body marker can be arranged as illuminated markers. In such an embodiment the adjustable mirrors are advantageously remotely adjustable by a remote control, and the illuminated markers can then also optionally be operated by this remote control.

The variant of illuminated markers, which can also include passive illumination by reflective stickers or using "glow in the dark" material, offers the additional benefit of also enabling proper mirror adjustment in the dark, which is not yet available in any form and would particularly benefit road traffic safety.

When illuminated markers are used, it is also possible to guide a truck driver through the steps of mirror adjustment by illuminating only one mirror marker for aiming and one body marker for targeting at the same time. With illuminated markers it also becomes possible to couple these to the operation of remote mirror adjustment devices so that only those markers are lit that are relevant to the mirror adjustment controls selected by the driver. Illuminated body target markers may also enable their reflections in the mirrors to become more readily recognizable without having to resort to large surface areas on the truck cabin bodies, which can sometimes be objectionable from aesthetic considerations.

The mirror adjustment assistance system of the invention can further comprise a main rear view mirror, and a wide-angle blind spot mirror on each the driver side and co-driver side of the cabin, and one single associated body target marker on each of the driver and co-driver sides for alignment with the aiming markers of respective individually adjustable mirrors, the main rear view mirror, and the wide-angle blind spot mirror on the co-driver side being part of the at least three adjustable mirrors. Such an embodiment may additionally also comprise a close proximity kerb mirror, and a blind spot front mirror both on the co-driver side, and each with an associated target marker positioned on the exterior of the cabin for being each exclusively alignable with the relevant kerb or front mirror, the close proximity kerb mirror being part of the at least three adjustable mirrors, and the target marker positioned for exclusive alignment with the kerb mirror being the second of the at least two body target markers.

In again another possible embodiment the aiming markers can each be within a distance of 20 mm from a surface edge of the relevant adjustable mirror and/or the aiming markers can each be spaced within 30 mm from a centre of a surface edge of the relevant adjustable mirror. In this regard the aiming marker of at least one of the at least three adjustable mirrors can advantageously be spaced within 10 mm from the centre of the relevant surface edge.

Further advantageous aspects of the invention will become clear from the appended description and in reference to the accompanying drawings, in which.

Figure 1:
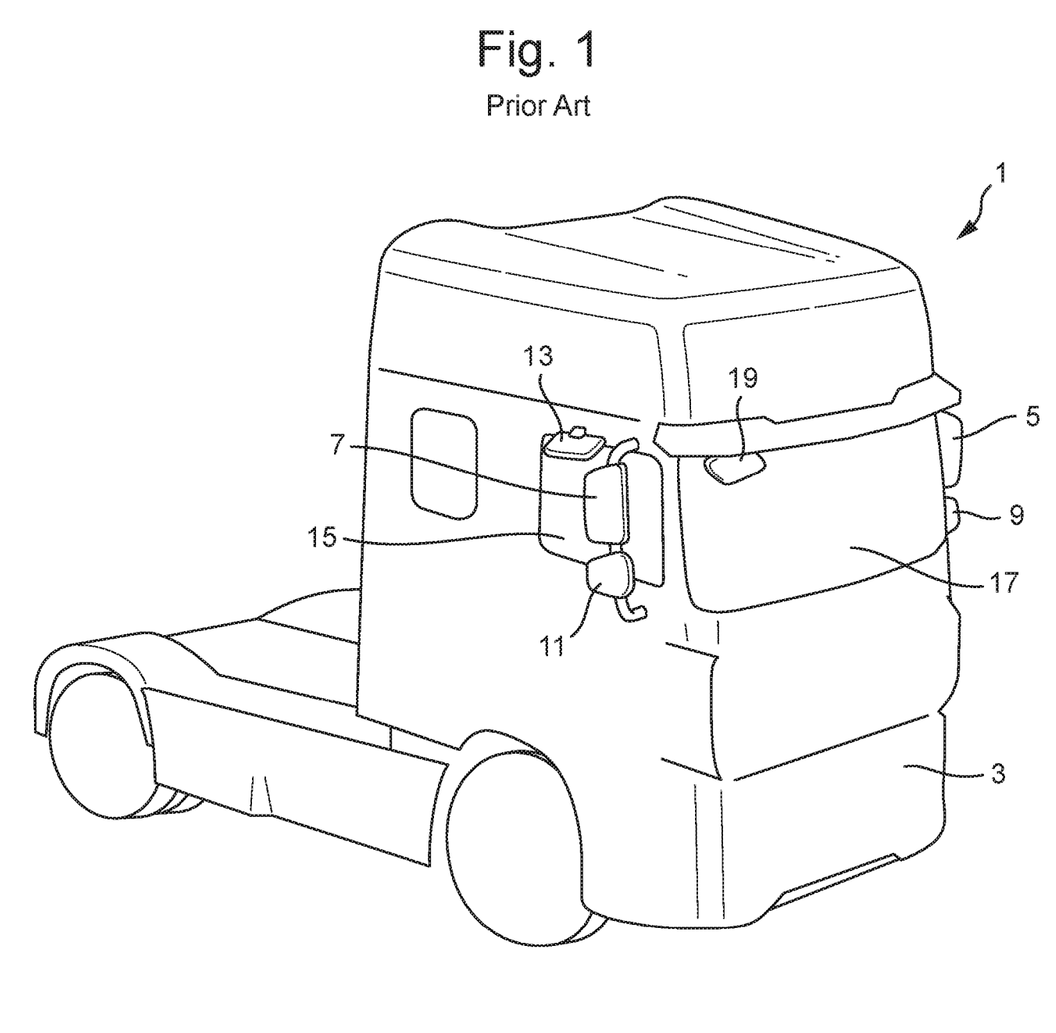
FIG. 1 shows a typical truck cabin with a legally required set of mirrors.

For the benefit of road safety, trucks such a the tractor 1 (shown here without the usual trailer) are currently required by law to have their cabins 3 fitted with a main rear view mirror 5 on the driver's side, and a similar main rear view mirror 7 on the co-driver's side, also called passenger's side. These rear view mirrors in accordance with the ECE-R46 standard are commonly referred to as class II mirrors. In addition to the left and right hand main rear view mirrors 5, 7, there also need to be fitted a wide-angle (class IV) mirror 9 on the driver's side, and a similar wide-angle (class IV) mirror 11 on the co-driver's side. Further provided on the co-driver's or passenger's side is a close proximity or kerb (class V) mirror 13. All these mirrors should be visible to the truck driver through the respective door windows, such as the co-driver's side door window 15. Visible through the windscreen 17 is a front (class VI) mirror 19. All these mirrors should be visible to the truck driver through the respective door windows, such as the co-driver's side door window 15, while the front (class VI) mirror 19 that covers a blind spot directly in front of the cabin 3 is visible through the windscreen 17.

Figure 2:
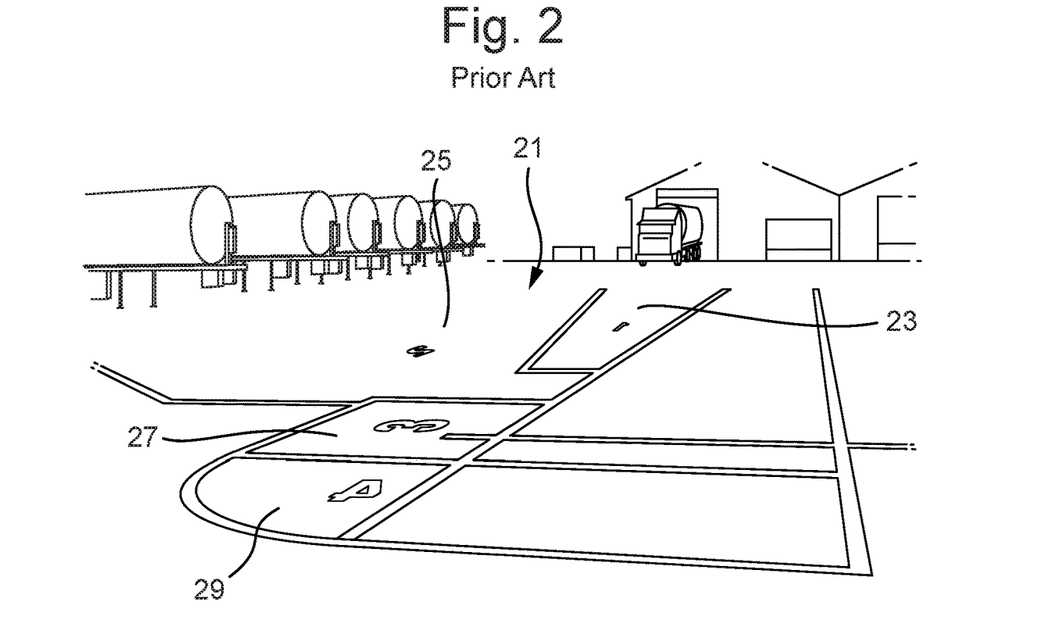
FIG. 2 shows a typical mirror adjustment area as provided on parking lots.
Figure 3:
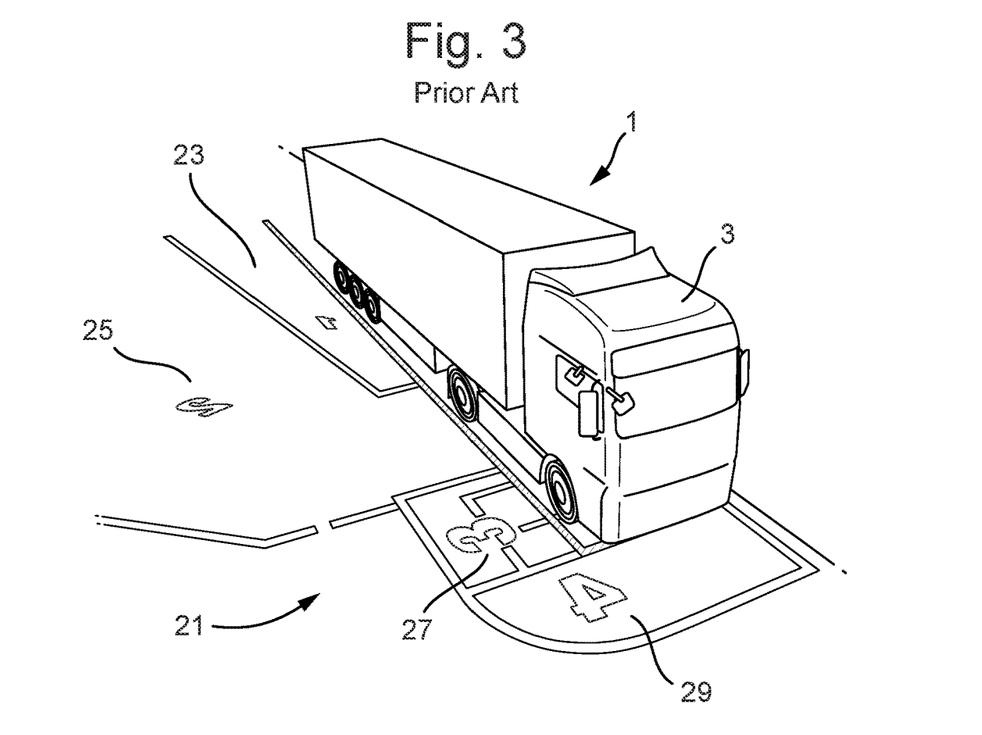
FIG. 3 is another view of a mirror adjustment area similar to FIG. 2, but with a truck positioned thereon.

Proper adjustment of this set of mirrors especially those remote from the driver at the co-driver's side, can at present only be ensured by using specially provided mirror adjustment areas 21, such as illustrated in FIGS. 2 and 3. Such mirror adjustment areas 21 need to be provided either at the premises of the truck owner, or be at locations where these can be shared by several truck drivers, such at parking lots and fuel stations. The mirror adjustment area 21 as shown in FIGS. 2 and 3 is subdivided in first, second, third and fourth sub-sections 23, 25, 27, 29. These first, second, third and fourth subsections are commonly numbered "1", "2", "3" and "4" in large mirror image numbers to be readily recognized in the mirrors. The first sub-section 23 numbered "1", corresponds to the main (class II) mirror field of vision on the co-driver's side as defined by paragraph 15.2.4.2.2 of ECE-R46. The second sub-section 25 numbered "2" corresponds to the wide-angle class IV) mirror field of vision on the co-driver's side as defined by paragraph 15.2.4.4.2 of ECE-R46. The third sub-section 27, numbered "3", corresponds to the kerb or close-proximity (class mirror field of vision as defined in paragraph 15.2.4.5.4 of ECE-R46. The fourth sub-section 29, numbered "4", corresponds to the front (class VI) mirror field of vision as defined in paragraph 15.2.4.6.1 of ECE-R46.

When as shown in FIG. 3 a truck is positioned in the remaining unnumbered section, its cabin 3 adjoins the third and fourth sub-sections 27, 29. In this position the main mirror on the co-driver's side (7 in FIG. 1) can be adjusted so that the entire first sub-section 23 is visible therein. The wide-angle mirror on the same side (11 in FIG. 1) can be adjusted so that both the first and second sub-sections 23, 25 can be viewed therein. The kerb mirror (13 in FIG. 1) is adjusted to at least show the third sub-section 27, numbered "3", therein, and the front mirror (19 in FIG. 1) should be adjusted to show the fourth sub-section 29, numbered "4", therein.

The mirror adjustment areas are mostly only concerned with the co-driver's side of the vehicle, as on the driver side the mirrors can usually be adjusted by the driver without additional assistance, albeit that some drivers may still have insufficient experience to do this without assistance.

Figure 4:
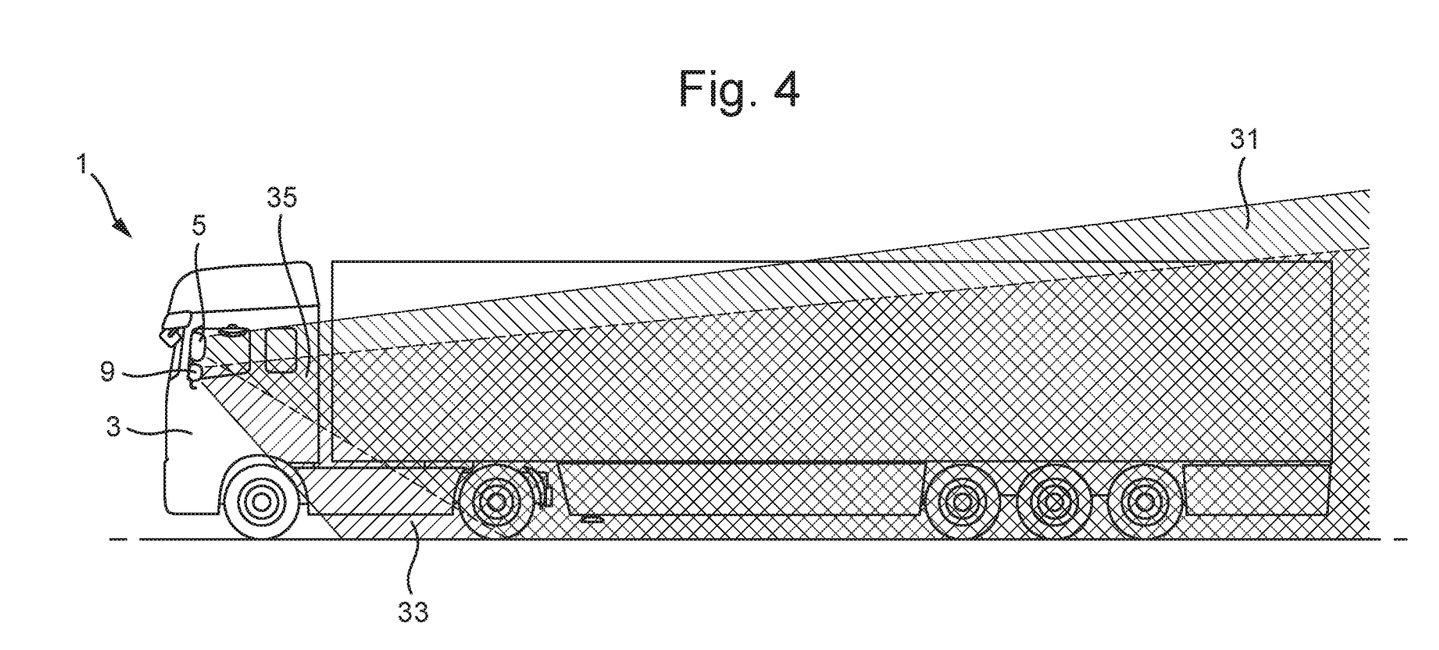
FIG. 4 is a side elevation of the driver's side of a truck with left hand steering, indicating the vertical fields of vision.

As shown in FIG. 4 there is also a vertical overlap between a field of vision 31 provided by the main mirror 5 on the driver's side, and a field of vision 33 provided by the wide-angle mirror 9 on the driver's side.

Figure 5:
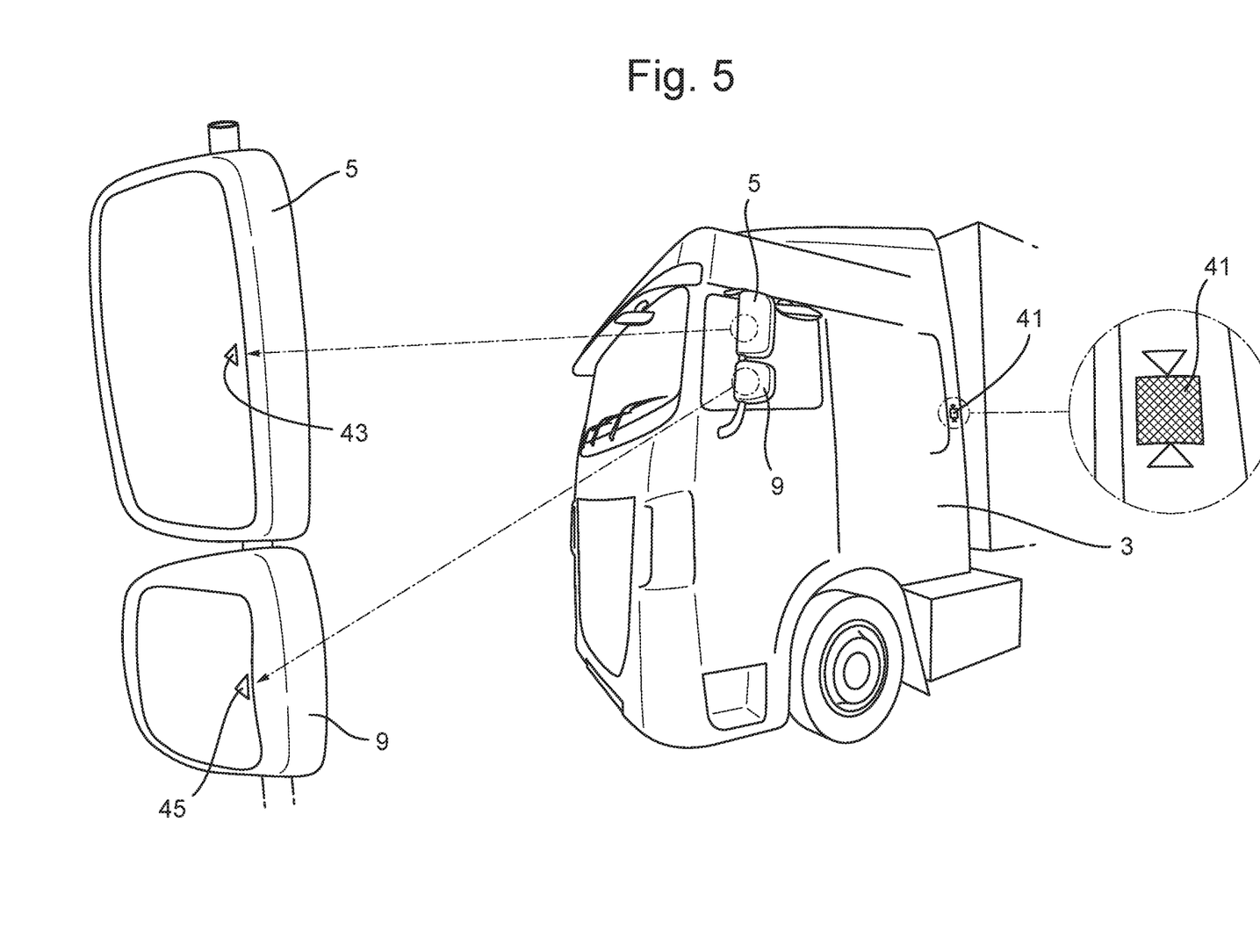
FIG. 5 shows the driver's side main and wide-angle rear view mirrors (class II & IV) with relative body marker.

To be more readily enabled to adjust the mirrors on the driver's side, even in the absence of mirror adjustment area sub-sections or for less experienced truck drivers the invention proposes a solution as illustrated in FIG. 5. A contrasting first marker 41, which will be used as a target marker, in this example is located on the cabin 3 of the truck or tractor or in an area of the cabin side wall where the vertical fields of vision of the main mirror 5 and the wide-angle mirror 9 overlap. This area is indicated as 35 in FIG. 4. Preferably the first marker 41, as shown in FIG. 5, is positioned as close as possible to the rear edge of the truck or tractor cabin 3. As an alternative the first marker can also be located on other visible parts of the vehicle, such as a truck or a trailer body behind the actual cabin. The main driver's side mirror 5 at an inner edge in this example is provided with a relatively small triangular second marker 43, which will be used as an aiming marker. Other forms of aiming markers can be easily conceived, and are not meant to be excluded by this example. The wide-angle driver's side mirror 9 at an inner edge is provided with a relatively small triangular third marker 45, also to be used as an aiming marker. When the driver now simply aligns the second marker 43 with the image of the first marker 41 positioned on the cabin and reflected in the main mirror 5, the main mirror becomes properly aligned for the driver that has made this adjustment. By also aligning the third marker 45 of the wide-angle mirror 9 with the image of the first marker 41 on the cabin reflected therein, the wide-angle mirror 9 will be equally properly aligned. For this purpose the use of only a single first marker 41 on the cabin for mirrors that have partially overlapping fields of vision, any confusion as to which marker applies to which mirror can completely be avoided.

Figure 6A:
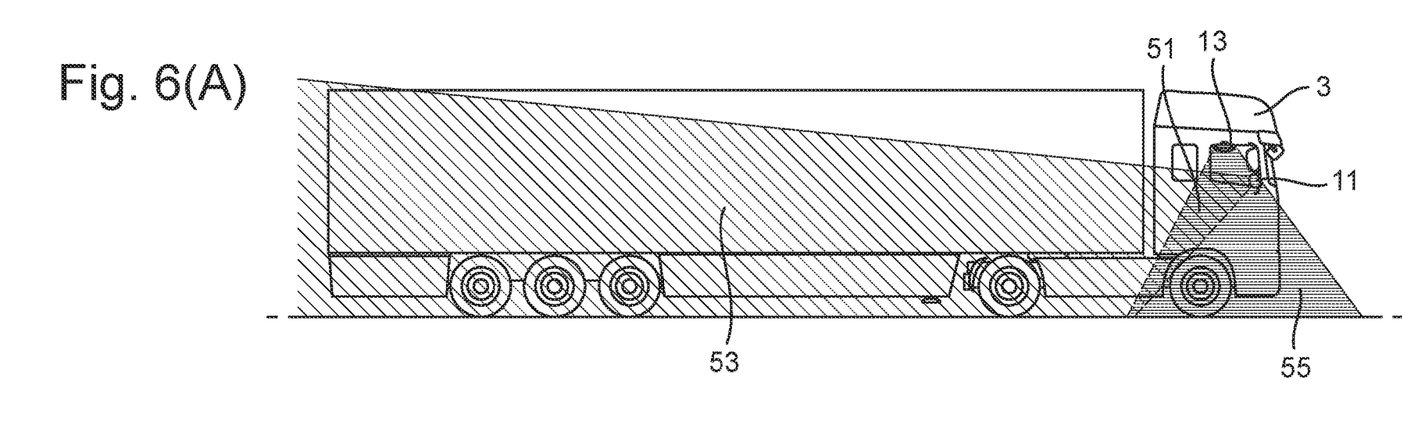
FIG. 6(A) is a side elevation the co-drivers, or passenger side of a truck with left hand steering, indicating the required vertical fields of vision of class IV and V mirrors.
Figure 6B:
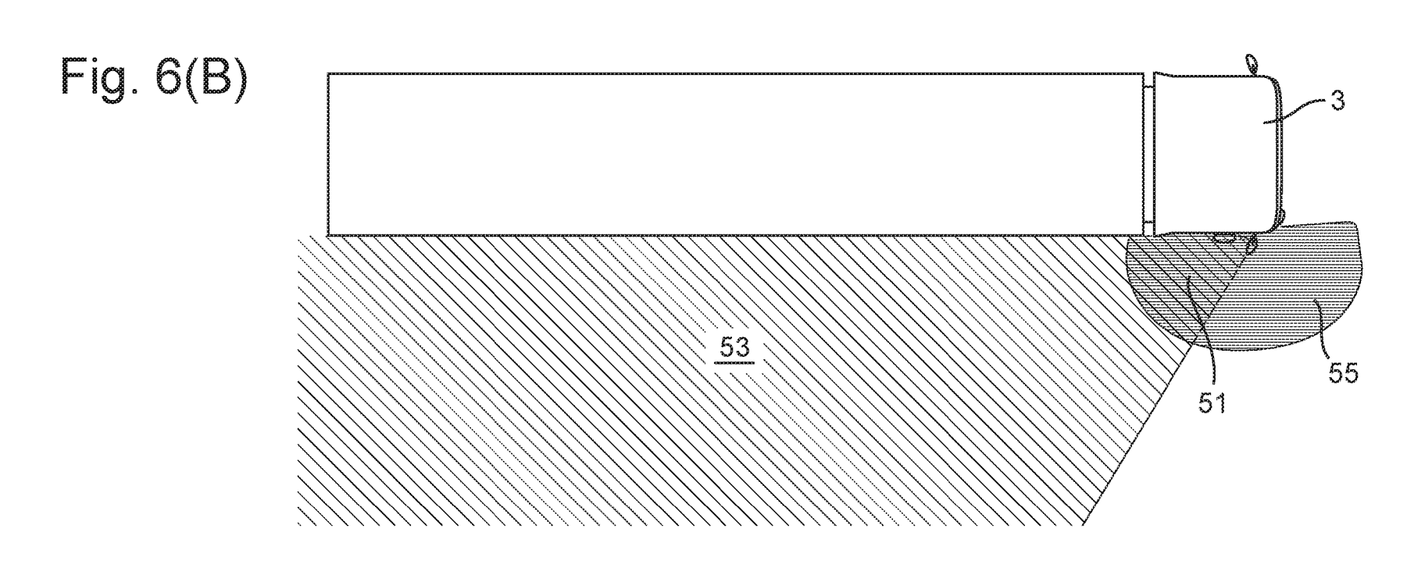
FIG. 6(B) is a plan view of the truck of FIG. 6(A), indicating the required horizontal fields of vision of class IV and V mirrors.

FIG. 6(A) is a side elevation of a truck having a cabin 3, and indicating an overlap 51 between a field of vision 53 of the wide-angle mirror 11 and a field of vision 55 of the kerb mirror 13 in a vertical plane. FIG. 6(B) shows the overlap 51 between the two fields of vision 53, 55 in a horizontal plane in relation to a top plan view of the truck and cabin 3.

Figure 7:
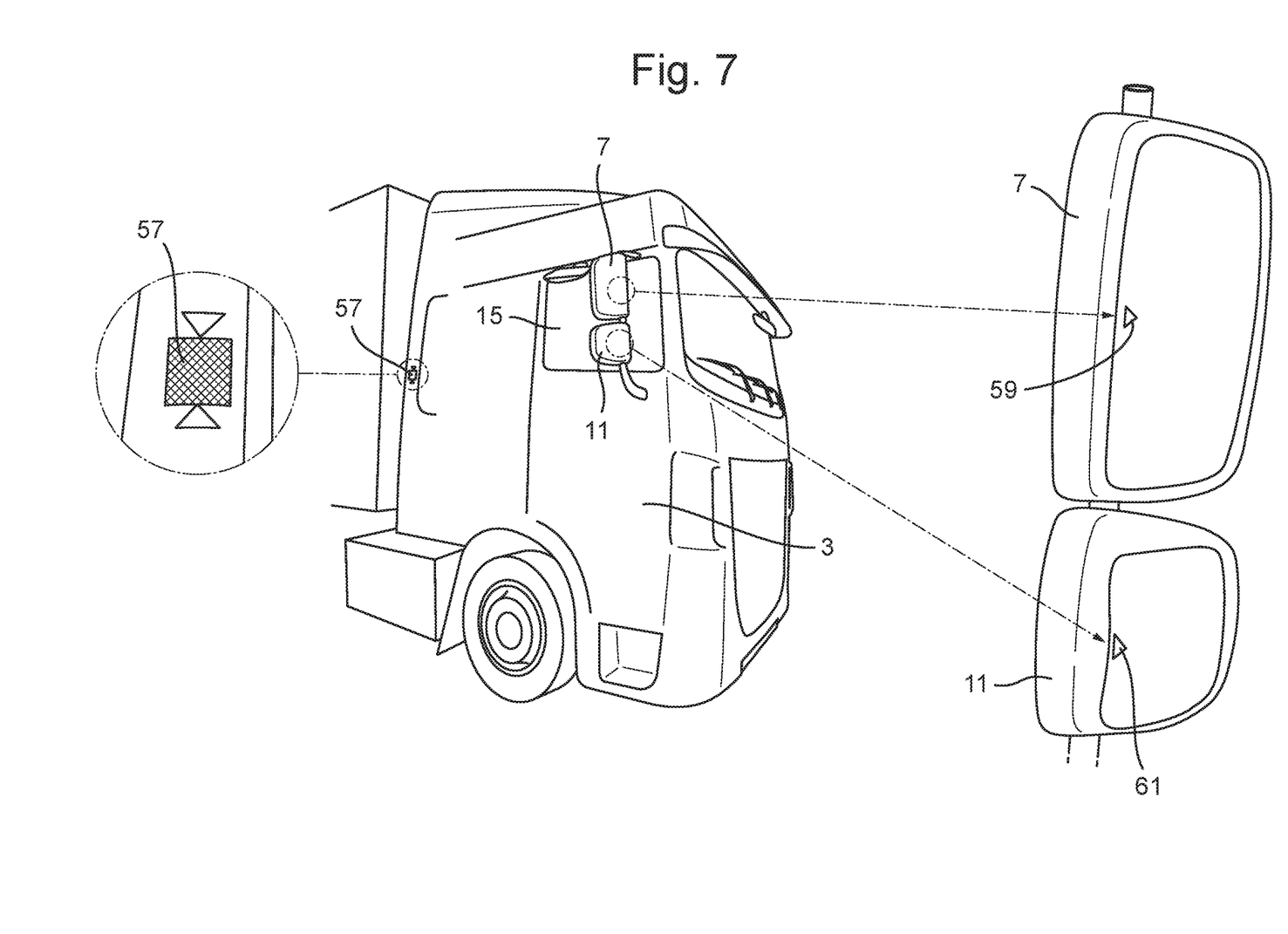
FIG. 7 shows the co-driver's, or passenger side main and wide-angle rear view mirrors (class II & IV), with relative body marker.
Figure 8:
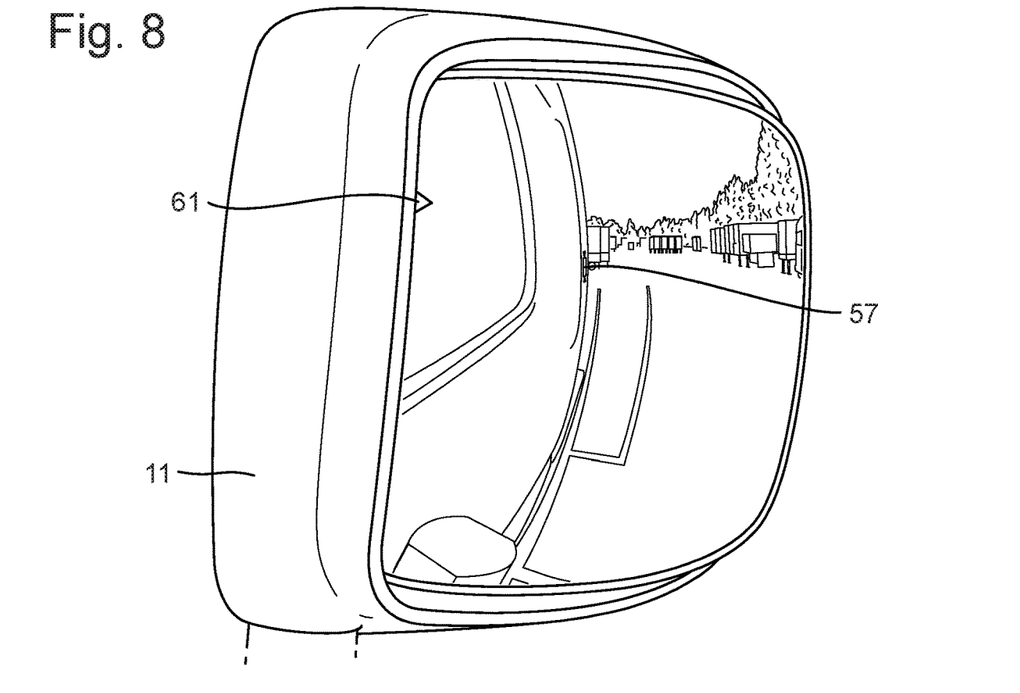
FIG. 8 shows the co-driver's side wide-angle rear view mirror (class IV) as seen from the driver's focal point in a yet inadjusted position.
Figure 9:
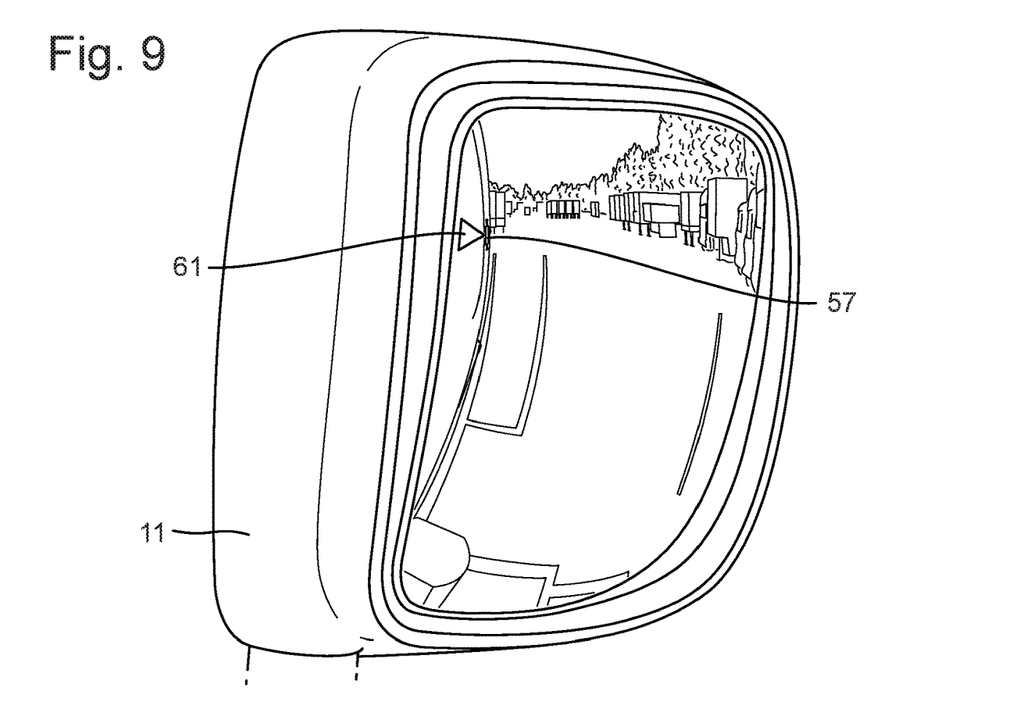
FIG. 9 shows the co-driver's side wide-angle rear (class IV) as seen from the driver's focal point in a fully adjusted position.

Reference will now first be made to FIGS. 7, 8 and 9 which are relevant to the adjustment of the main and wide-angle mirrors 7, 11 on the co-driver's side. Similar to the explanation given in reference to FIG. 5, it is seen in FIG. 7 that the body of the cabin 3 is provided with a fourth marker 57, serving as a target marker, which is in a corresponding position at the rear edge of the respective cabin wall side as the first marker 41. Similarly again the main mirror 7 carries a fifth marker 59 at an inner edge of the mirror surface. The wide-angle co-driver's side mirror 11 carries a sixth marker 61 at an inner edge of its mirror surface. Bothe the fifth and the sixth markers 59, 61 are serving as aiming markers.

Adjustment is again made by aligning the reflected image of the fourth marker 57 on the cabin in both mirrors 7, 11 with their respective fifth and sixth markers 59, 61 through angular adjustment of the mirror surfaces.

As additionally shown in FIGS. 8 and 9 for an example of the wide-angle mirror 11 the adjusting procedure is further explained. FIG. 8 shows the unadjusted position where the sixth marker (aiming marker) 61 on the mirror surface, and the reflected image of the fourth marker (target marker) 57 are spaced from one another. By angularly adjusting the mirror 11 in a direction to bring the fourth (target) marker 57 and sixth (aiming) markers 61 together as shown in FIG. 9 the wide-angle mirror 11 will be properly adjusted. It will be clear that the adjusting procedure of all the mirrors described herein will be substantially similar to the example of FIGS. 8 and 9.

Figure 10:
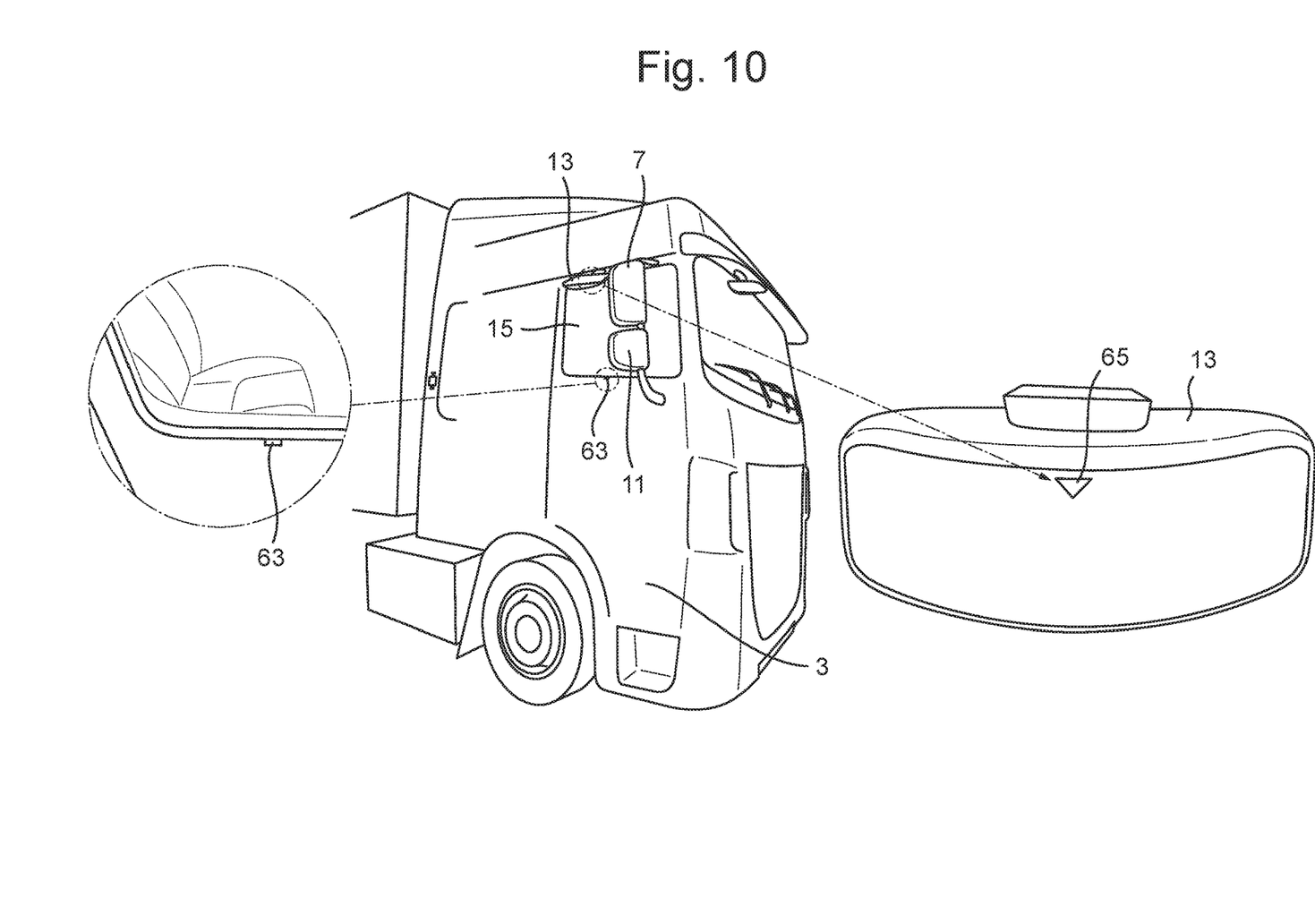
FIG. 10 shows co-driver's side kerb mirror (class V), with its related body marker.

FIG. 10 illustrates the kerb (class V) mirror 13 in relation to an associated seventh marker 63 on the body of the truck cabin 3, and a corresponding eighth marker 65 on the upper edge of a mirror surface of the kerb mirror 13.

Having reference to FIG. 6 it is seen that there is an important overlap 35 between the fields of vision of the kerb mirror 13 with the wide-angle mirror 11. To avoid confusion with the fourth marker (target) 57 for the rear view mirrors the eighth marker (aiming marker) 65 of the kerb mirror 13 should be in a position where it cannot be aligned with this fourth marker (target) 57. Conversely the seventh marker (cabin target) 63 for the kerb mirror 13 should preferably be in a position where it cannot be aligned with either the fifth or the sixth markers (aiming markers) 59, 61 of the rear view (class II and IV) mirrors 7, 11. Within these preferred boundaries a suitable location for the seventh marker 63 has been found on the cabin door at a bottom edge of the side door window 15 on the co-driver's side of the cabin 3.

Figure 11:
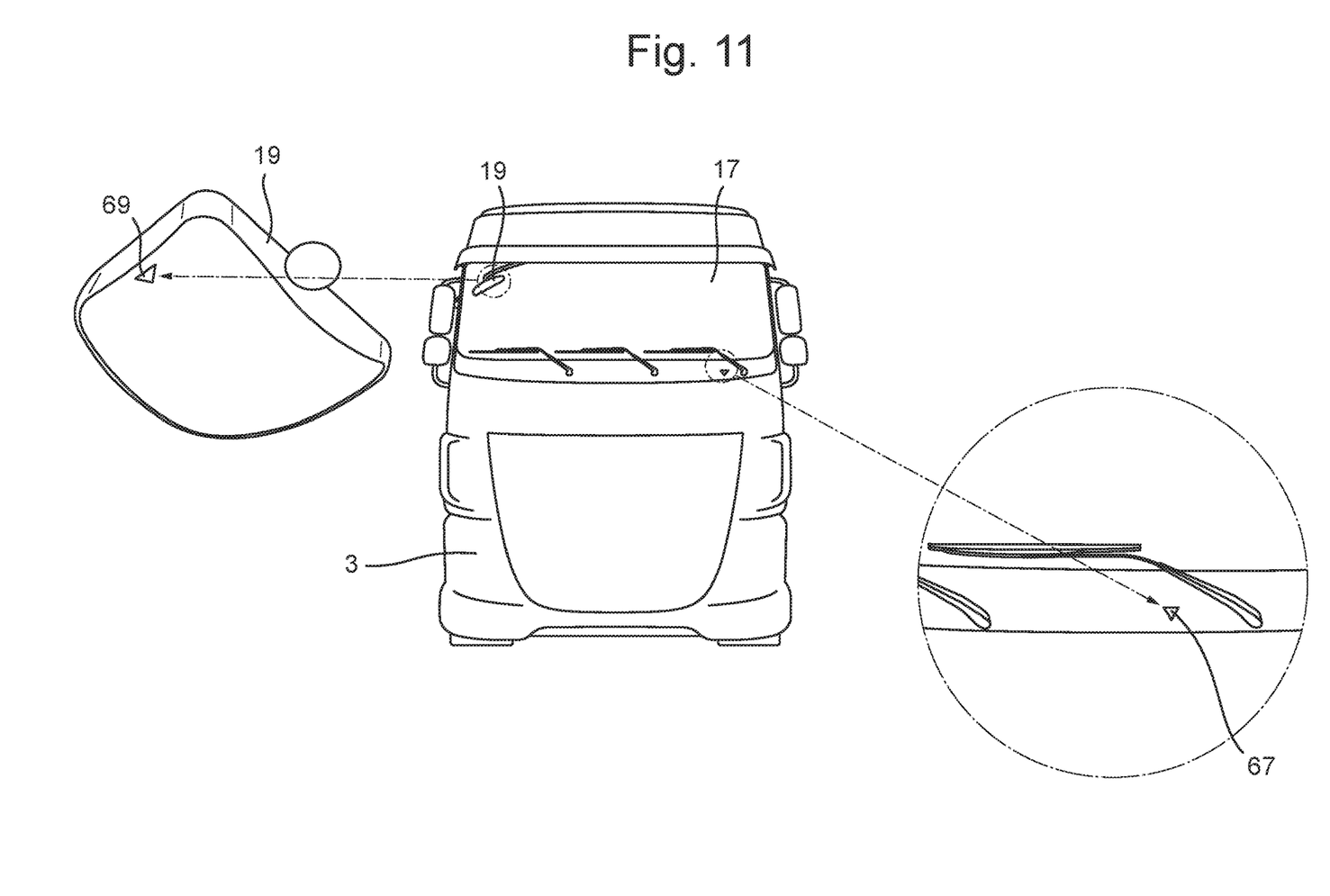
FIG. 11 shows the front side of the truck cabin with the front (class VI) mirror with its related body marker.

In FIG. 11 the front side of the truck cabin 3 is shown with the front (class VI) mirror 19 at a top edge of the windscreen 17. As shown in an enlarged detail view, a ninth marker 67 used as a target marker is positioned at a bottom edge of the windscreen 17, diagonally opposite to the location of the front mirror 19 at the top edge of the windscreen 17. The front mirror 19 is provided with a tenth marker (aiming marker) 69 along an outer edge of its mirror surface.

Figure 12:
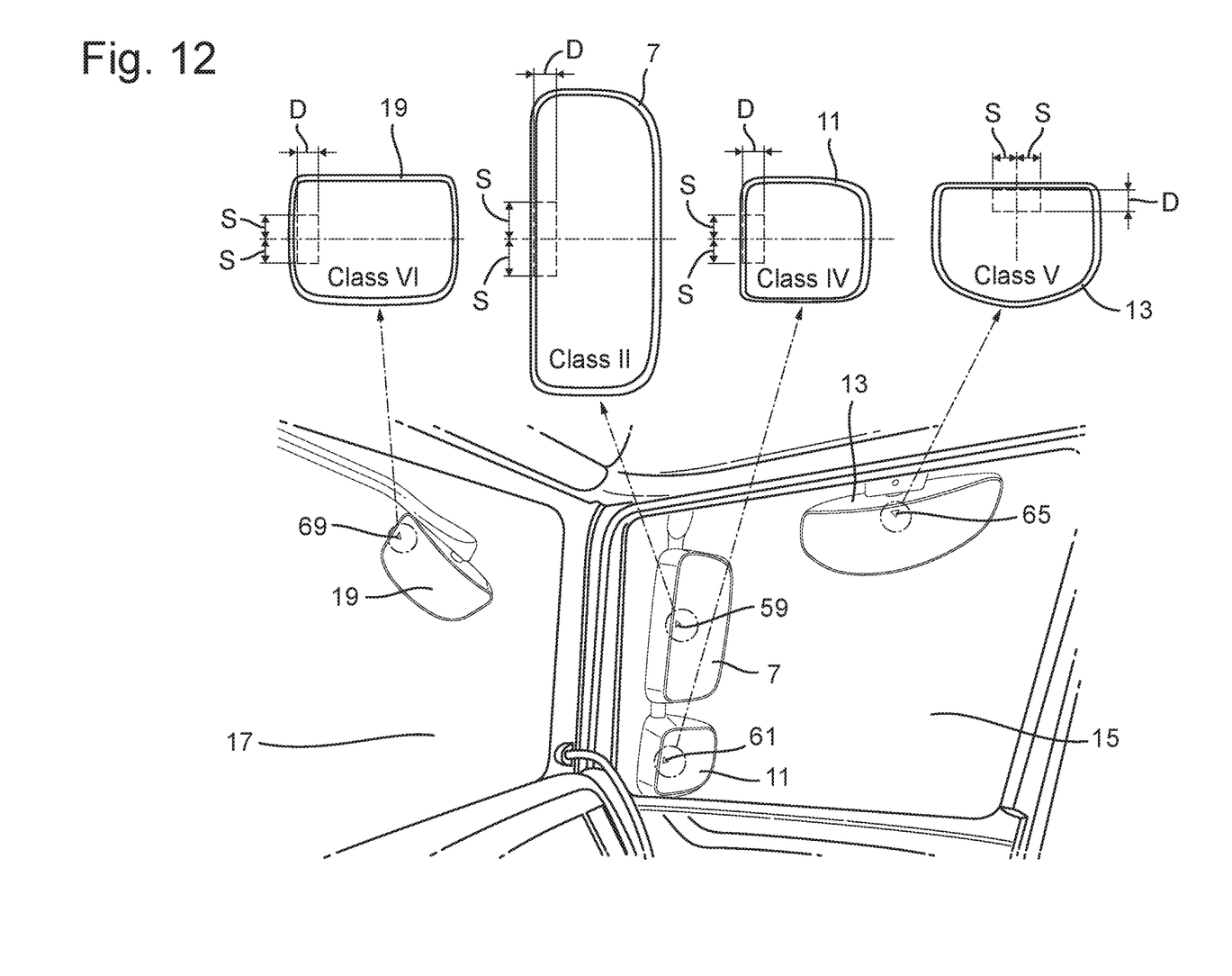
FIG. 12 shows the preferred areas for the mirror markers of the main and wide-angle rear view mirrors (class II and IV), the kerb mirror (class VI) and the front mirror (class VI).

Illustrated in FIG. 12 are the locations of the various reference makers on the mirror surface as they would appear to the driver through the side door window 15 and the windscreen 17. In particular the location of the aiming marker on the various mirror surfaces is restricted to a confined area. The aiming fifth marker 59 on the main (class II) rear view mirror 7 is best confined to a location not beyond a distance D of 20 mm from the inside edge, and not beyond 30 mm above or below the vertical center of the inside edge. The aiming sixth marker 61 on the wide-angle (class IV) rear view mirror 11 is again best located within a distance D of 20 mm from the inside edge, and not higher or lower than a spacing S of 10 mm from the vertical center of the inside edge. The aiming eighth marker 65 of the class V kerb mirror 13, and the aiming tenth marker 69 of the class VI front mirror 19 are best located within a distance D and spacings S from the vertical center of their respective edges that correspond to those of the class IV wide-angle mirror 11 (i.e. D=20 mm; S=10 mm). The location of the aiming markers, when restricted to these confined areas will enable use of position markers, or target markers on the cabin as described hereinabove. At the same time the aiming markers do not obstruct the field of vision to any obtrusive extent.

The size of the aiming marker on the mirror surface is possibly small, but should be large enough, at least on the co-driver's side of the cabin to be easily discernible from the driver's side of the cabin. The aiming fifth, sixth, eighth and tenth markers 59, 61, 65, 69 should preferably be within a size range of a circular diameter or square size of 5 to 10 mm. The aiming second and third markers 43, 45 on the driver's side can be in accordance with the lower boundary of this 5-10 mm range.

For the cabin target first, fourth, seventh and ninth markers 41, 57, 63, 67 it is preferred for these to provide reflected images in the respective mirrors within a circular or square size range of 10 to 20 mm, i.e. to be at least twice as large as the related aiming marker.

Where in this specification reference has been made to a marker, it is to be understood that this expression, not only refers to passive markers, such as contrasting surface color indicia, patches or stickers, but also to active markers, such as illuminated markers, such pilot lights or LED's. Illuminated markers also need not be of an active variety, but can also include those of a passive variety, such reflective or irradiating markers. The latter variant of illuminated markers offers the additional benefit of enabling proper mirror adjustment in the dark, which is not yet available in any form and would be particularly beneficial to road traffic safety.

When illuminated markers are used, it is also possible to guide a truck driver through the steps of mirror adjustment by illuminating only one mirror marker for aiming and one body marker for targeting at the time. Also it becomes possible with illuminated markers to couple these to the operation of remote mirror adjustment devices so that only those markers are lit that are relevant to the controls selected by the driver. Also when illuminated body target markers are used it becomes possible to obtain more readily recognizable reflections in the mirrors without having to use large surface areas on the truck cabin bodies.

When using only passive markers it may be advantageous to have the best possible contrast between the color of the target markers and the truck cabin color. As truck cabin may come in a great variety of colors, it may sometimes be necessary to enhance recognition to the cabin target marker by providing a border to the target marker that has a complementary color. Such a complementary colored border preferably has a width of 2.5 to 5 mm.

Also markers may all have the same form such as circular, triangular or rectangular, but may also have different forms in accordance with their purpose to be more readily recognizable.

Accordingly there is described a mirror adjustment assistance system for trucks having as part of a vehicle body at least a cabin 3 having a front side with respect to an intended main direction of travel, a driver side, and a co-driver side. At least three independently and individually adjustable mirrors 5, 7, 9, 11, 13, 19 are attached to an exterior of the cabin 3, each of these at least three adjustable mirrors 5, 7, 9, 11, 13, 19 has an aiming marker 43, 45, 59, 61, 65, 69 on or adjacent to its reflective surface. At least two vehicle body target markers 41, 57, 63, 67 are positioned on an exterior surface of the vehicle body 3, and at least a single one 41; 57 of these at least two vehicle body target markers is associated with two of the at least three mirrors 5, 9; 7, 11. Any the aiming markers 43, 45, 59, 61, 65, 69 of the at least three adjustable mirrors 5, 7, 9, 11, 13, 19 can each only be aligned with a single one of the at least two vehicle target markers 41, 57, 63, 67.

It is thus believed that the operation and construction of the present invention will be apparent from the foregoing description and drawings appended thereto. For the purpose of clarity and a concise description features are described herein as part of the same or separate embodiments, however, it will be appreciated that the scope of the invention may include embodiments having combinations of all or some of the features described. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extend that structure, material, or acts are considered to be essential they are inexpressively indicated as such. Additions, deletions, and modifications within the purview of the skilled person may generally be made without departing from the scope of the invention, as determined by the claims.

The invention claimed is:

1. A mirror adjustment assistance system for a truck having, as part of a vehicle body, at least a cabin having a front side with respect to an intended main direction of travel, a driver side, and a co-driver side;

the mirror adjustment assistance system comprising:

at least first, second, and third independently adjustable mirrors being all attached to either the driver side or the co-driver side of the cabin, said first, second, and third independently adjustable mirrors having respective first, second, and third aiming markers on or adjacent continuous reflective surfaces of said first, second, and third independently adjustable mirrors; and at least first and second vehicle body target markers on an exterior surface of the vehicle body, wherein a first image of the first vehicle body target marker, in a first field of view of the continuous reflective surface of the first independently adjustable mirror, is alignable with the first aiming marker of the first independently adjustable mirrors, wherein a second image of the first vehicle body target marker, in a second field of view of the continuous reflective surface of the second independently adjustable mirror, is alignable with the second aiming marker of the second independently adjustable mirror, wherein an image of the second vehicle body target marker, in a third field of view of the continuous reflective surface of the third independently adjustable mirror, is alignable with the third aiming marker of the third independently adjustable mirror, wherein no image of the second vehicle body target marker, is alignable in the first field of view with the first aiming marker or in the second field of view with the second aiming marker, and no image of the first vehicle body target marker is alignable in the third field of view with the third aiming marker.

2. The mirror adjustment assistance system according to claim 1, wherein any aiming marker of the at least first, second, and third independently adjustable mirrors is alignable with an image of only a single one of the at least first and second vehicle body target markers in the respective fields of view of the continuous reflective surfaces of said at least first, second, and third independently adjustable mirrors.

3. The mirror adjustment assistance system according to claim 1, wherein the first adjustable mirror is a main rear view mirror, and the second adjustable mirror is a wide-angle blind spot mirror, and the first and second images of the first vehicle body target marker are alignable with the respective first and second aiming markers of these first and second adjustable mirrors.

4. The mirror adjustment assistance system according to claim 3, wherein the first vehicle body target marker is located at a rear edge of the cabin with respect to the intended main direction of travel.

5. The mirror adjustment assistance system according to claim 3, wherein the first, second, and third adjustable mirrors are located on the co-driver side, wherein the third adjustable mirror is a close proximity kerb mirror and wherein the second vehicle body target marker is positioned for being exclusively alignable with the third adjustable mirror.

6. The mirror adjustment assistance system according to claim 1, wherein at least two of the first, second, and third adjustable mirrors are remotely adjustable by electric power.

7. The mirror adjustment assistance system according to claim 1, wherein at least one of the first, second, and third aiming markers, and at least one of the first and second vehicle body target markers are readily recognizable indicia contrasting with their immediately surrounding surface area.

8. The mirror adjustment assistance system according to claim 1, wherein at least one of the first and second vehicle body target markers is a three dimensional structure protruding from an immediately surrounding surface area.

9. The mirror adjustment assistance system according to claim 1, wherein at least one of the first, second, and third aiming markers, and/or at least one of the first and second vehicle body target markers are illuminated markers.

10. The mirror adjustment assistance system according to claim 9, wherein at least two of the first, second, and third adjustable mirrors are remotely adjustable by a remote control, and wherein the illuminated markers are also operated by the remote control.

11. The mirror adjustment assistance system according to claim 1, wherein the first and second independently adjustable mirrors comprise a main rear view mirror and a wide-angle blind spot mirror attached to the co-driver side of the cabin, and wherein the first vehicle body target marker is attached to the co-driver side of the cabin, and wherein the mirror adjustment assistance system further comprises a second main rear view mirror and a second wide-angle blind spot mirror attached to the driver side of the cabin, and a third vehicle body target marker attached to the driver side of the cabin.

12. The mirror adjustment assistance system according to claim 3, wherein any aiming marker of the first, second, and third independently adjustable mirrors is alignable with an image of only a single one of the at least first and second vehicle body target markers in the respective fields of view of the continuous reflective surfaces of said at least first, second, and third independently adjustable mirrors, wherein the third adjustable mirror is a close proximity kerb mirror attached to the co-driver side of the cabin, and wherein the second vehicle body target marker is an associated kerb mirror target marker positioned on the exterior of the vehicle body for being exclusively alignable with the kerb mirror.

13. The mirror adjustment assistance system according to claim 1, further comprising a blind spot front mirror on the co-driver side, and an associated front mirror target marker positioned on the exterior of the vehicle body for being exclusively alignable with the front mirror.

14. The mirror adjustment assistance system according to claim 1, wherein the first, second, and third aiming markers are each within a distance of 20 mm from a surface edge of the respective first, second, and third independently adjustable mirrors.

15. The mirror adjustment assistance system according to claim 1, wherein the first, second, and third aiming markers are each spaced within 30 mm from a centre of a surface edge of the respective first, second, and third independently adjustable mirrors.

16. The mirror adjustment assistance system according to claim 15, wherein at least one of the first, second, and third aiming markers is spaced within 10 mm from the centre of the surface edge of at least one of the respective first, second, and third independently adjustable mirrors.

* * * * *